(No Model.) 6 Sheets—Sheet 5.

F. H. RICHARDS.
WEIGHING MACHINE.

No. 559,213. Patented Apr. 28, 1896.

Witnesses:
R. W. Pittman
Fred. J. Dole.

Inventor:
F. H. Richards.

(No Model.) 6 Sheets—Sheet 6.

F. H. RICHARDS.
WEIGHING MACHINE.

No. 559,213. Patented Apr. 28, 1896.

Witnesses:
R. W. Pittman,
Fred. J. Dole.

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 559,213, dated April 28, 1896.

Application filed August 10, 1895. Serial No. 558,815. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved valve mechanism and an organization of coacting devices particularly adapted for maintaining a continuous stream of material to the bucket of the machine and for insuring a perfect control of the supply-stream at all times and the making up of accurate loads on each successive operation of the machine.

Figure 1:
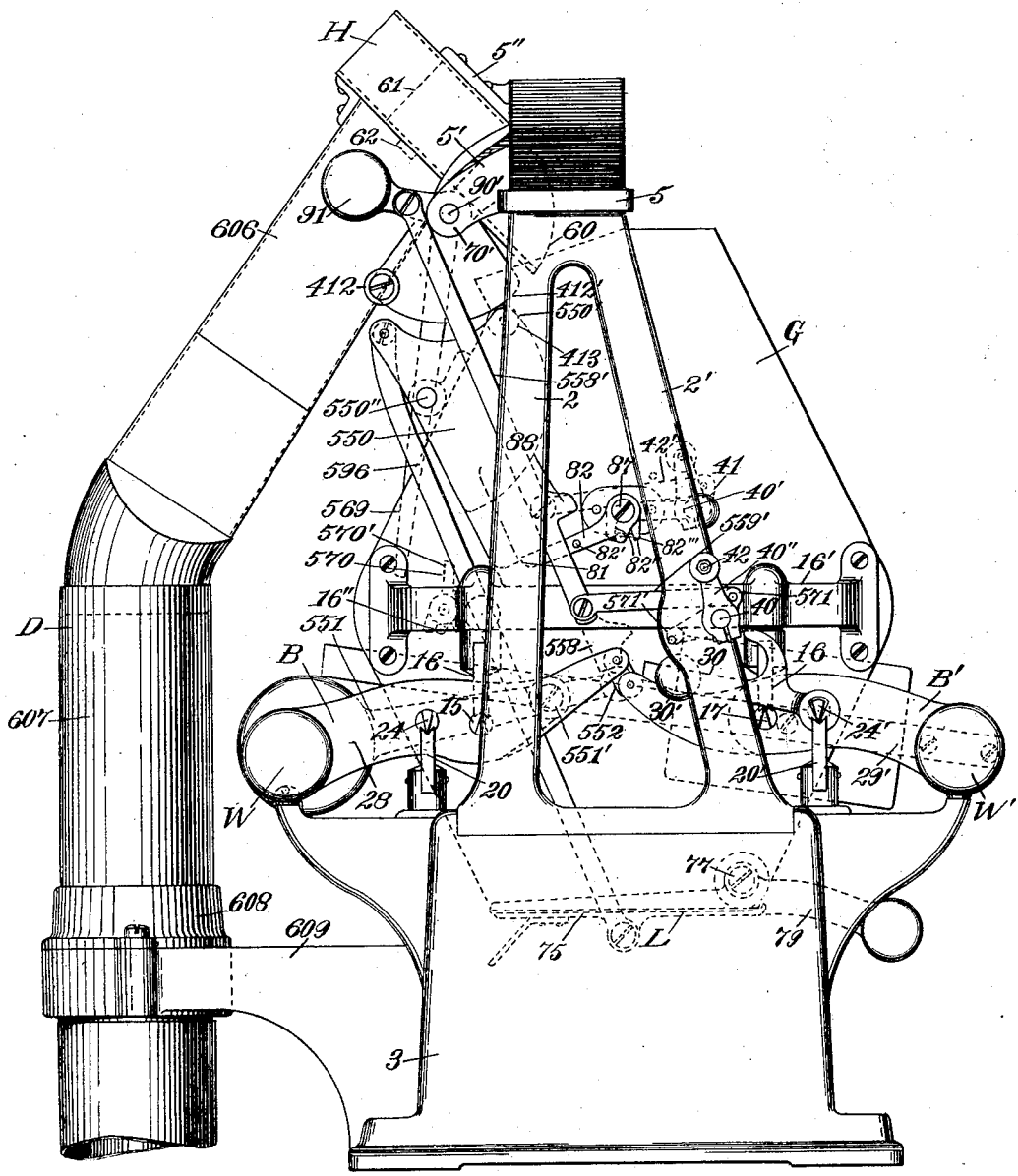
Figure 2:
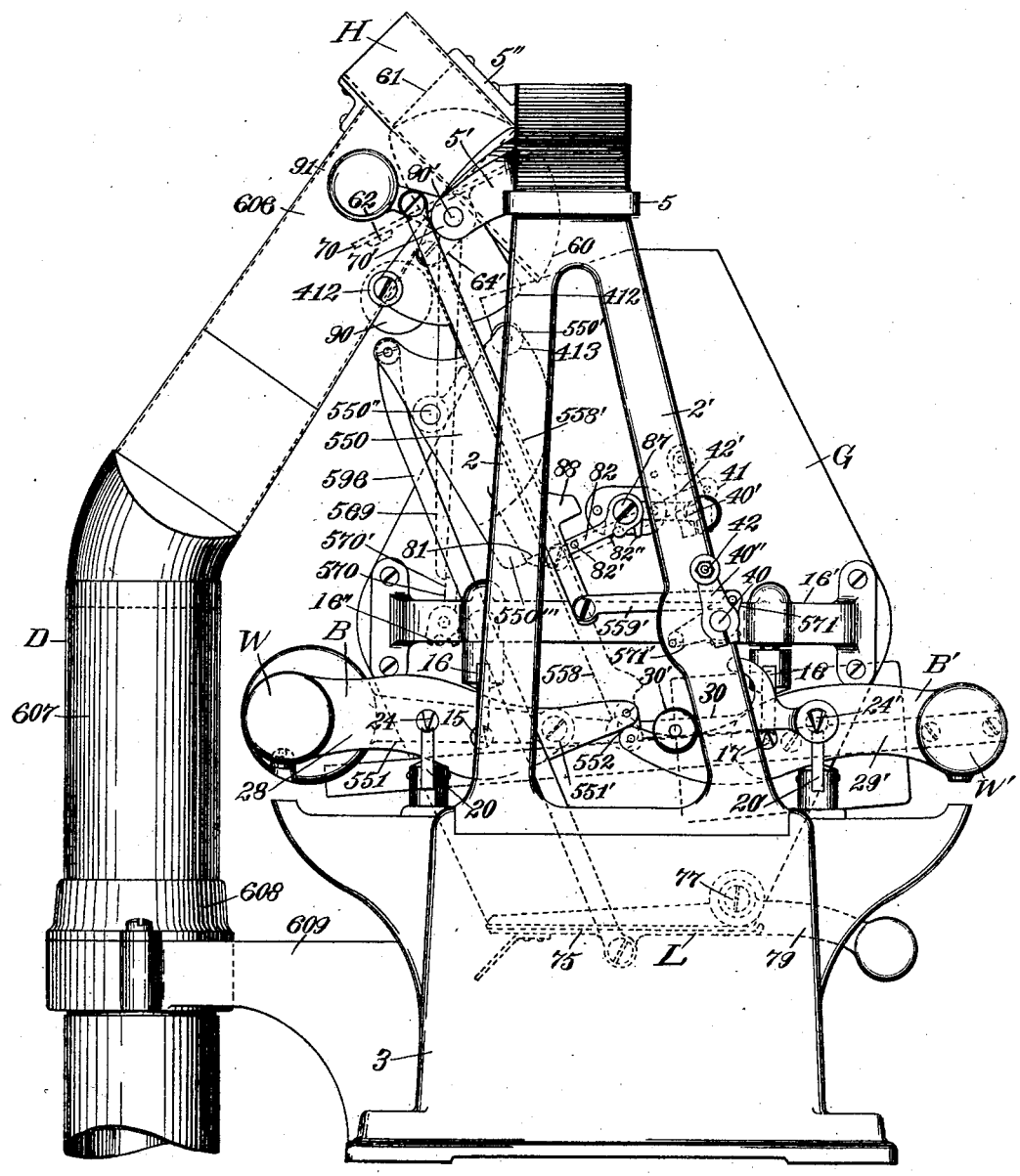
Figure 3:
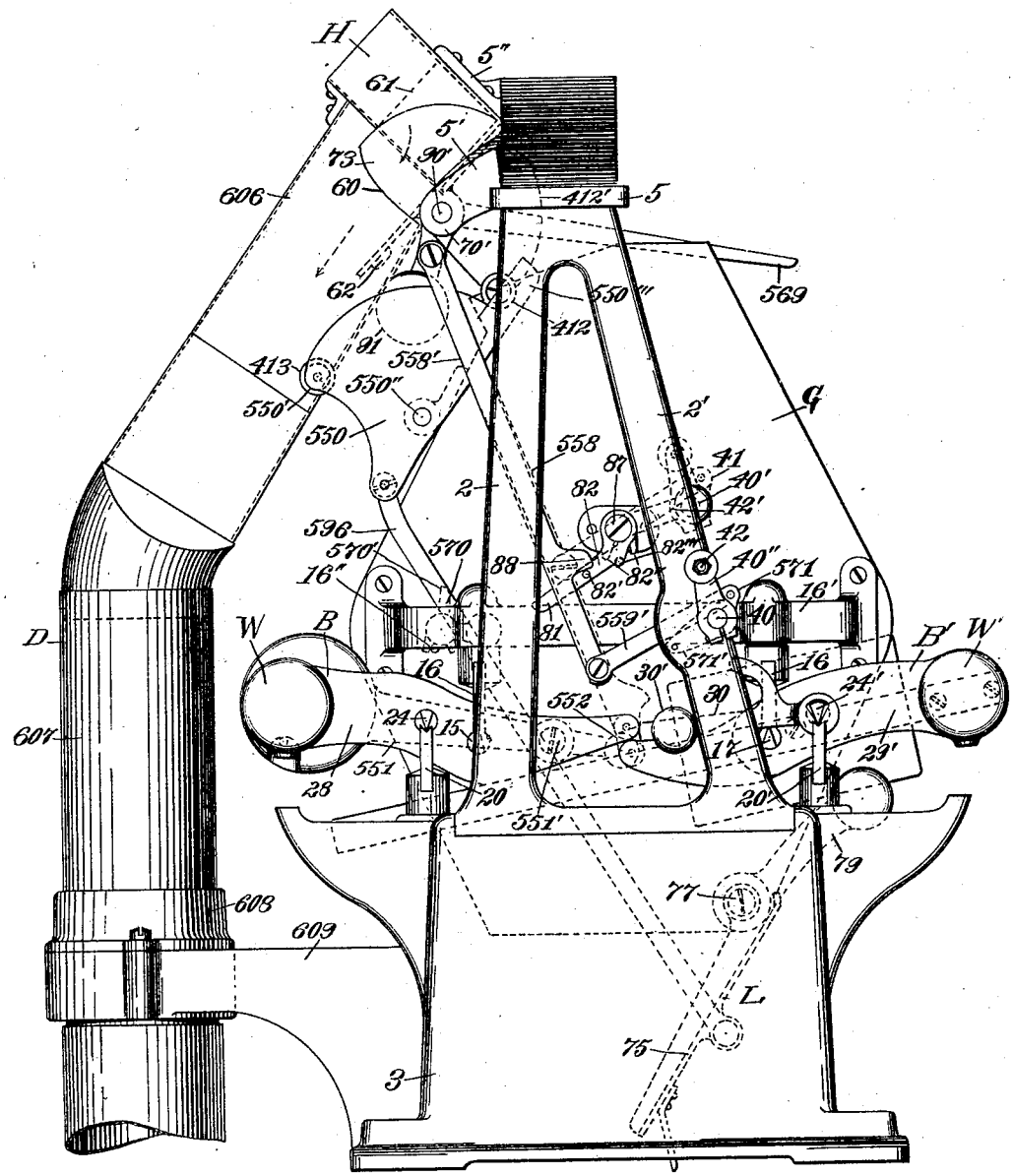
Figure 4:
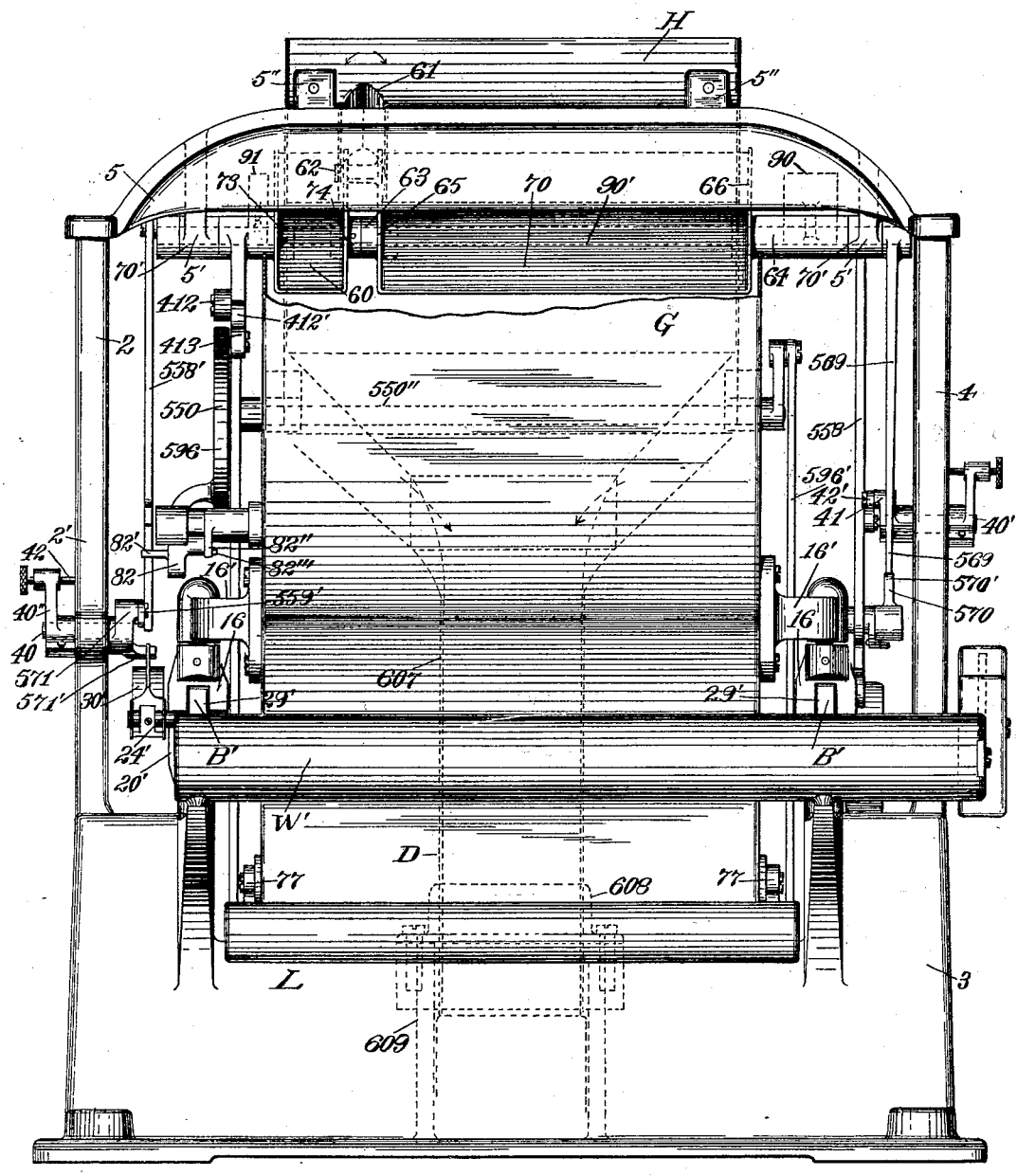
Figure 5:
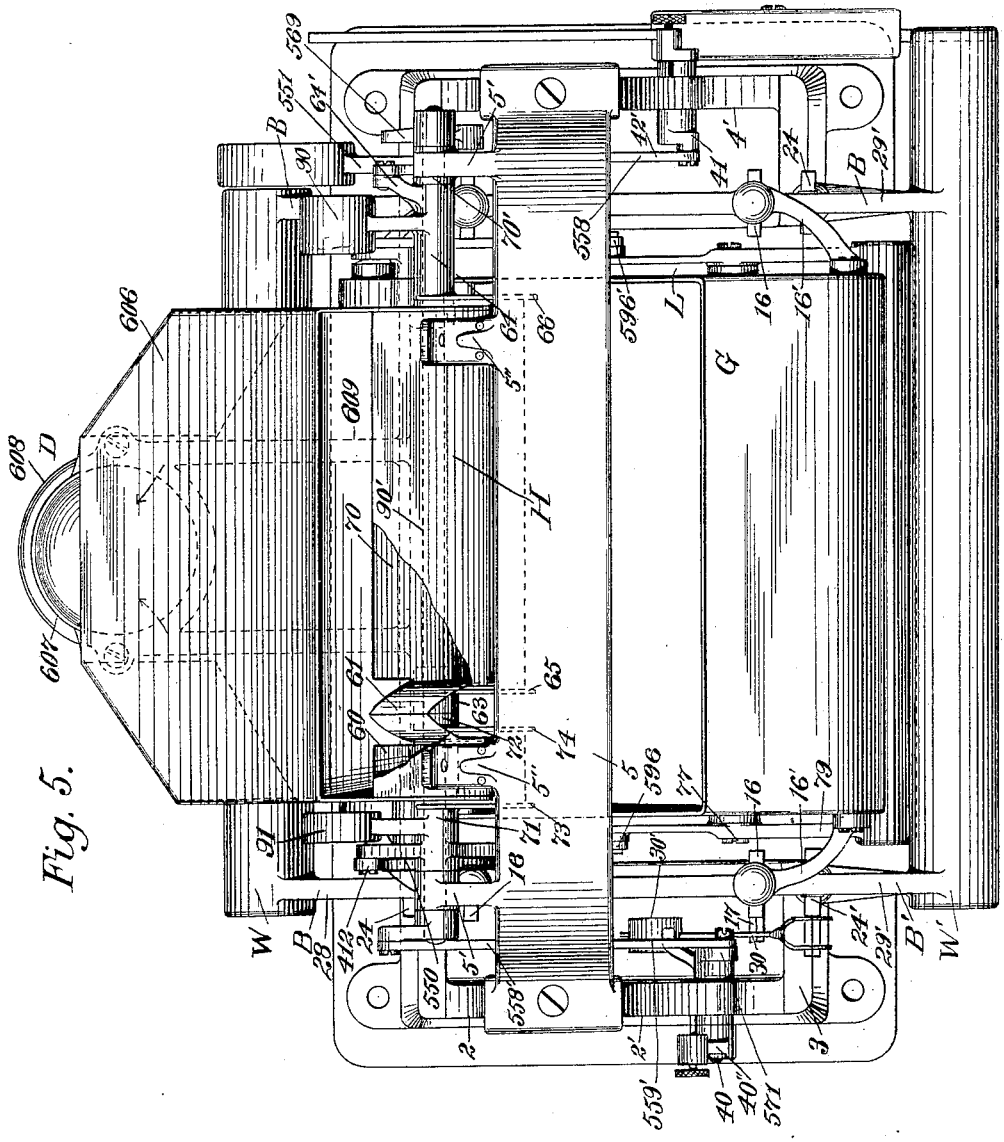
Figure 6:
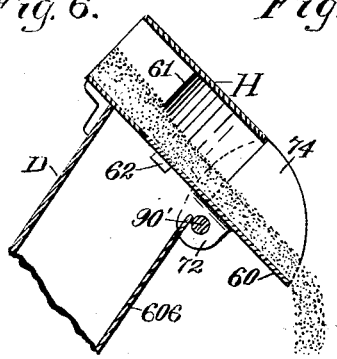
Figure 7:
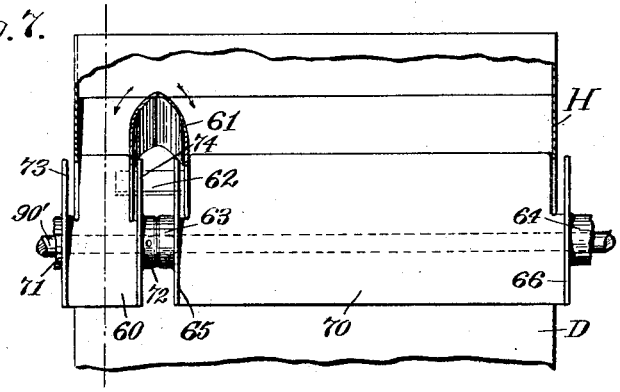
Figure 8:
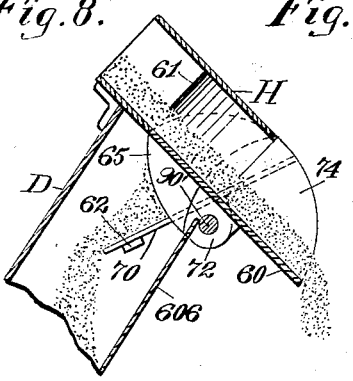
Figure 9:
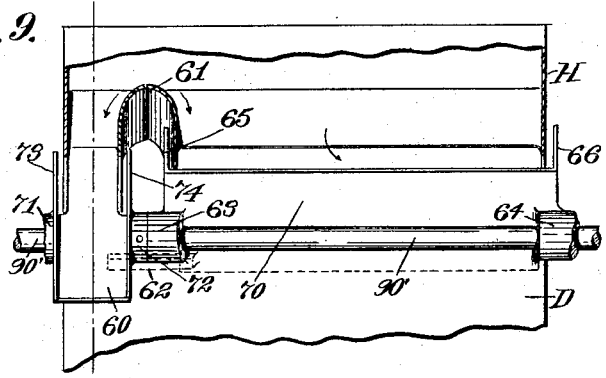
Figure 10:
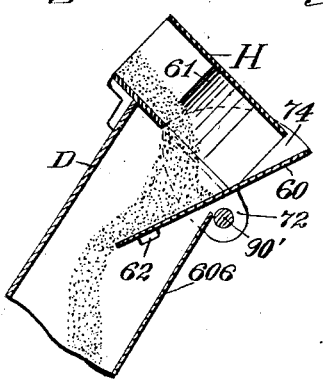
Figure 11:
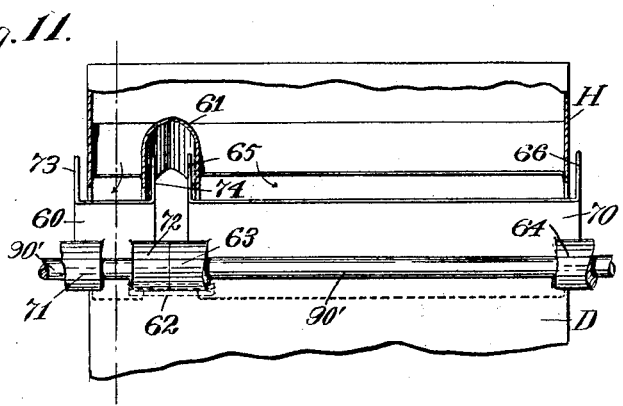

In the drawings accompanying and forming part of this specification, Figure 1 is a right-hand end elevation of a weighing-machine constructed in accordance with the present improvements and also showing a pair of stream-controllers or valves in position for permitting the full stream to enter the bucket, it being assumed that the bucket is empty. Fig. 2 is a similar view of the machine, showing the main-stream controller or valve in the position it occupies when the main portion of the supply-stream is cut off or is diverted away from the bucket, the bucket having received a partial load. Fig. 3 is a similar view, showing both of the stream-controllers or valves in the positions they occupy when the whole stream is cut off or is diverted away from the bucket, and this on the completion of the bucket-load. Fig. 4 is a front elevation of the apparatus with the parts approximately in the positions in which they are shown in Fig. 1, and Fig. 5 is a plan view of the same. Figs. 6, 8, and 10 are detail views, partly in section, and show a supply and a discharge chute and the stream-controllers or valves, respectively, in the following positions: Fig. 6 shows both stream-controllers or valves in position for permitting the flow of the full stream into the bucket. Fig. 8 shows the main valve as having diverted away from the bucket a portion of the stream and the supplemental valve permitting the continued flow of a reduced stream, and Fig. 10 shows both valves or stream-controllers in a position diverting the whole stream away from the bucket. Figs. 7, 9, and 11 are, respectively, plan views of the parts shown by Figs. 6, 8, and 10, and the valves are each shown in positions corresponding, respectively, with the latter views.

Similar characters designate like parts in all the figures of the drawings.

The present improvements are shown applied to the improved weighing-machine described and claimed in my application, Serial No. 541,087, filed March 9, 1895; but it will be obvious that these improvements may be used as well in connection with other types of machines.

The framework for carrying the operative parts of the mechanism or machine may be of any suitable construction and is shown in the drawings comprising two side frames or uprights 2 and 4, mounted upon a chambered supporting-base 3, and connected by a top plate or beam 5, to which is shown connected, by means of the connecting-plates 5'', a supply-chute H. The supporting-base 3 is shown herein carrying some suitable beam-supports or V-shaped bearings 20 and 20' for supporting the scale-beams, which carry the bucket mechanism, consisting of the bucket and its operative devices.

As a means for supporting the bucket or load-carrying receptacle a pair of oppositely-disposed counterweighted beams are shown at B and B', respectively, and pivotally mounted on the beam-supports by means of pivots or knife-edges 24 and the oppositely-disposed pivots or knife-edges 24', and also having bucket-supports located intermediate of said beam-supports, these bucket-supports being shown in the drawings comprising two remotely-disposed pairs of pivots or knife-edges 15 and 17.

Each of the scale-beams is preferably composed of a pair of beam-arms joined by a combined connecting-shaft and counterpoise, (the counterpoise for the beam B being designated by W and that for the beam B' being designated by W'.) Each of the scale-beams, therefore, as is usual, has a bucket-poising portion and a bucket-counterpoising portion.

Each of the beam-arms comprises a bucket-poising and a bucket-counterpoising member or end, (the bucket-counterpoising portions of the beam-arms for the scale-beam B being designated by 28 and the bucket-counterpoising portion of the oppositely-disposed arms of the beam B' being designated by 29'.)

Some suitable means for maintaining the movements of the scale-beams in unison, and hence the movements of the beam-arms in unison, will be employed, and such means is shown herein as a guide connection—such, for instance, as links 552, pivotally connected to each of the beam-arms. The bucket-poising portions of the scale-beams, it will be evident, comprise all those portions of said beam-arms which lie between the supporting knife-edges 24 and 24' by which the beams are supported.

The bucket (designated in a general way by G) is of the "single-chambered" type or class, and is pivotally mounted on the oppositely-disposed beam-arms and is shown herein having bearing-faces 16, carried by the hangers 16', in position for engaging the bucket-supports 15 and 17, carried by the beam-arms of the scale-beams B and B'.

The bucket-closer (designated in a general way by L) is shown consisting of a suitably-formed plate or closer proper, 75, having a counterweighted arm 79, the closer being illustrated pivoted at 77 to the lower side of the bucket.

As a means for supporting the closer L, an inverted toggle is shown in the drawings connecting the closer and the bucket, and this toggle-connection is so positioned as to be engaged by a latch when the closer is shut. In the form of toggle shown, this consists of a bucket-discharge stop or rocker 550, which is shown pivoted adjacent to the upper rearward side of the bucket to the rock-shaft 550'', and having a long connecting-rod 596 pivoted to the rocker and also to the closer L in such a manner that when the closer is shut the two pivots of said connecting-rod or toggle member will be nearly in line with and the upper of said pivots will be above the rocker-pivot, whereby, when the rocker is engaged by the bucket-closer latch and held in that position, the closer will be supported with a minimum pressure on the latch. A connecting-rod is also shown at 596', connecting the opposite side of the closer with a rock-shaft 550''.

The closer-latch (designated in a general way by 82) for locking the rocker in position when the closer is shut is shown herein pivoted at 87 to the bucket and also having a detent or stop 81 in position and adapted for engaging a coöperating detent 550''' on the rocker 550.

Stops 82'', carried by the bucket, are preferably provided for coacting with the stop 82''', carried by the latch for limiting the movements of said latch 82, which latter is preferably counterweighted.

In connection with the bucket of a weighing-machine I employ a supply-chute for supplying a stream of material to the bucket and a pair of stream-controllers located end to end and in position and adapted for controlling the supply-stream, and means for shifting both of said stream-controllers for permitting the full stream to flow into the bucket and for shifting one of said stream-controllers relatively to the other for varying the trajectory of a portion of the supply-stream.

For supplying the stream of material to the bucket I prefer to employ the supply-chute shown, which has been hereinbefore described as suitably carried by the top plate 5.

For controlling the supply-stream I prefer to employ the valves or stream-controllers shown, which are illustrated as located end to end, and which are in position and adapted for diverting the supply-stream from the bucket by successive shifts or movements. Hence it will be understood that when these valves or stream-controllers are in one position the full stream will be permitted to flow into the bucket and one of them will be shifted or actuated for diverting away from the bucket part of the stream and the other for diverting away the residue of the stream—that is, the stream-controllers are successively shifted for cutting off the supply-stream.

The supply-chute H (see Figs. 1, 2, and 3) is shown constituting one member of a conductor apparatus, the other member of which is shown as the discharge-chute D. When the streams are diverted away from the bucket, the trajectory will be varied and the streams may be successively directed to the discharge-chute D, as illustrated by said figures, on the partial and complete loading of the bucket.

The discharge-chute D is suitably supported from the base 3 and is shown consisting of a relatively large conduit 606, into which the stream is diverted and then conveyed to the pipe or tubular portion 607. The receiving end or mouth of the conduit portion of the discharge-chute D is shown relatively wide and located relatively adjacent to the upper rear edge of the bucket and also in close proximity to the supply-chute H. For holding the discharge-chute in place the tubular portion thereof is shown provided with an annular flange or collar 608, resting on and secured to the rearwardly-extending base plate or frame 609, carried by the base 3 of the machine. The supply-chute may be supplied with material in the manner disclosed in my prior application, Serial No. 544,864, filed April 8, 1895—that is, by an elevator apparatus, which elevates the material from a suitable bin or receptacle and directs the stream to the supply-chute, and when the supply-stream is diverted away from the bucket it is directed to the discharge-chute D and conveyed to the bin or receptacle—its original source of supply—thereby maintaining a stream of material in circuit form. It will be evident that when the stream is diverted away from the bucket and directed to the discharge-chute D this is done without stopping the flow of the stream.

The stream-controllers or valves are shown at 60 and 70, and constitute, respectively, a main reducing-valve or main-stream controller and a supplemental valve or supplemental-stream controller. These stream-controllers or valves are supported from the shaft 90', which latter is illustrated pivoted between the arms or brackets 5', shown depending from the top plate 5.

It will be observed that the stream-controllers or valves 60 and 70 are shown spaced or separated and located end to end. The stream-controllers are preferably made flat, and it will be noticed, on reference to the sectional views 6, 7, and 8, that these are shown normally forming part of the supply-chute, the upper faces of the steam-controller or valves 60 and 70, when the full stream is flowing into the bucket, being in alinement with each other as well as with the upper face of the floor of the supply-chute H. From this it will be readily apparent that no obstruction is offered to the free flow of the supply-stream or any portion thereof. The stream-controllers, by reason of their flatness, permit and induce a spreading out and thinning of the supply-stream, so that this may be evenly distributed over the entire surface of these controllers, and it will be obvious from this that but a slight shift or oscillation of the stream-controllers or valves will be necessary to divert the stream away from the bucket. Consequently, by reason of this construction, it follows that a perfect control of the supply-stream will be maintained at all times.

When the valves or stream-controllers are in a position for directing the stream into the discharge-chute or away from the bucket, these stream-controllers or valves, as they are shifted for directing the stream to the bucket, will positively prevent clogging or blocking of the material at the stream-controlling point.

The main-stream controller is adapted to control the major portion of the supply-stream, and, of course, varies the trajectory of said portion by diverting it away from the bucket on the partial completion of the bucket-load. The supplemental-stream controller will still be in a position for permitting the flow of a reduced stream, which flows into the bucket until the completion of the bucket-load. On the completion of a bucket-load the supplemental valve is immediately shifted by suitable means for varying the trajectory of the residue of the stream, or that small portion thereof known as the "drip-stream," by diverting this to the discharge-conduit of the conductor apparatus. As stated, the material is supplied to the bucket by the supply-chute H, and on the completion of a bucket-load, the whole stream having been diverted away therefrom, the stream is returned to the conductor apparatus. Consequently it will be apparent that by means of the conductor apparatus the flow of the stream is not stopped on the completion of a bucket-load.

For securing a more perfect control of the supply-stream and for preventing waste of the material at the stream-controlling point and insuring the making up of accurate loads the stream-controllers or valves 60 and 70 are illustrated as spaced or separated by means of a separator 61, which is carried by and located in the supply-chute and is shown as wedge-shaped, its point extending up into the supply-chute H. As the stream flows toward the bucket, it is by means of the separator 61 divided into two streams, a main stream, which is controlled by the main-stream controller or main valve 70, and a supplemental or drip stream, which is controlled by the supplemental-stream controller or supplemental valve 60. The member 61, in addition to serving as a separator, also serves as a stop for limiting one of the movements of the stream-controllers 60 and 70, and the movement shown so limited by said member is that which directs the stream to the bucket. It will be seen then that a member is provided which is in the nature of a combined stream-controller stop and stream-separator.

The upper faces of the floor of the supply-chute H and the stream-controllers or valves 60 and 70 are illustrated substantially in alinement or flush with each other, the stream-controllers or valves, when the full stream is flowing into the bucket, practically forming a continuation of the floor of the supply-chute. The floor of the chute is shown provided with two discharge-openings therein of a width approximately equaling the width of the stream-controllers, and these latter close the said discharge-openings when the full stream is flowing into the bucket. When the stream is diverted away from the bucket, either partially or wholly, the stream or streams so diverted are directed through these discharge-openings toward the discharge-chute D.

As hereinbefore stated, the stream-controllers or valves 60 and 70 are supported by and from the shaft 90', which latter is shown pivotally supported at 70' between the arms or brackets 5' depending from the top plate 5. The stream-controllers, as hereinbefore stated, are preferably shiftable synchronously in one direction, and in that direction for permitting the flow of the full stream into the bucket, and in the opposite direction are shiftable successively for successively varying the trajectories of portions of the supply-stream by diverting the streams away from the bucket.

The main valve or main-stream controller 70 is shown mounted loosely on the shaft 90', while the supplemental valve 60 is shown fixed to said shaft 90'. For shifting or actuating these valves or stream-controllers to divert the stream away from the bucket I prefer to employ the counterweighted actuating-levers 90 and 91, respectively, for the main and supplemental stream controllers or valves.

For directing a flow of the stream to the bucket I prefer to reversely shift or actuate the supplemental valve by and from the power or the main valve 70, and the latter is preferably operated by and from the beam mechanism. The main valve is shown having an actuator in the form of a pin 62, which is adapted, when the full stream is to flow to the bucket, to engage the supplemental valve 60 to shift or actuate the supplemental valve for bringing said supplemental valve to a position for permitting the small stream to flow into the bucket.

Each of the valves or stream-controllers is shown provided with a pair of laterally-projecting hubs. The hubs for the main valve 70 are shown at 63 and 64 and those for the supplemental-stream controller or supplemental valve 60 at 71 and 72, which hubs may be secured to the valves or stream-controllers in any suitable manner. The hubs 63 and 64 of the main valve 70, while fixed to said main valve and movable therewith, are shown loosely supported on the shaft 90'. The supplemental valve-hubs 71 and 72 are shown fixedly secured to the shaft 90' for movement with said shaft. The main valve is shown provided with end guards 65 and 66 and the supplemental valve with similar end guards 73 and 74 for preventing waste during the shifting movements of said valves.

As hereinbefore stated, I prefer to shift the supplemental valve synchronously with the main valve when these are brought to a position for permitting the full stream to flow into the bucket. For diverting the stream away from the bucket these stream-controllers or valves are successively actuated or shifted. First the main valve is shifted and then the supplemental valve. For shifting the main valve to permit the main stream to flow into the bucket I prefer to employ an actuator operated by and from the beam mechanism.

The hub 64 of the main valve is shown at 64', provided with a laterally-projecting arm, and to said arm 64' is shown pivoted a long actuating rod or arm 558, the lower or free end of this rod being in position and adapted to be engaged by an actuator.

The connecting rod or arm 558 is illustrated constituting the means for conveying to the main valve 70 the shifting movement for bringing said main valve, and through said main valve the supplemental valve 60, to a position for permitting the flow of the full stream into the bucket. The actuator for actuating said connecting-rod 558, and through the latter the valves, comprises a counterweighted lever 551, pivoted at 551' to the scale-beam B' and forming part of the beam mechanism.

It will be observed that the pivot 551' of the actuator 551 is located between the bucket-supports, so that any downward pressure exerted upon the inner end of the actuating-lever 551 relatively to the bucket will oscillate said supplemental counterpoise 551, and a very slight oscillatory movement will shift the same from counterpoising to the poising mechanism of the machine.

The connecting-rod has been described as having its lower or free end in position and adapted to be engaged by this actuator. When free to actuate the valve 70, the connecting-rod 558 serves as a part of the valve-actuator, but when the opposite movement of the valve is prevented it will be evident that this rod forms a stop device for limiting or checking the stream-diverting movement of the valve 70.

When the bucket has nearly completed its load, the main valve 70 is shifted for diverting the main stream away from the bucket. When the main valve has been shifted, the supplemental valve or supplemental-stream controller will still be in a position for permitting the continued flow of the reduced or small stream.

As a means for controlling the duration of the reduced stream the valve-shaft is shown provided with a long depending stop arm or lever 569, oscillatory with the supplemental valve 60 and fixed to the valve-shaft 90'. The stop arm or lever 569 is adapted to be engaged by a coöperating stop carried by the bucket, and at a predetermined point in the descent of the bucket. The stop carried by the bucket is shown at 570 pivoted to the hanger 16', and is in the nature of a counter-weighted by-pass stop.

Means are provided for limiting the movement of the by-pass stop 570, and such means are shown comprising as top 16", located between coacting limiting-stops carried by the by-pass stop 570. The length of the latch portion 570' of the by-pass stop 570 relatively to the lever 569 is such that when the valve is stopped on its partial oscillation or at the commencement of its poising period the by-pass stop will not release said lever, which would permit a complete oscillation of the valve 60. The lever is not released until at a proper point in the descent of the bucket G the latch-arm 570' will be carried beyond the lever 569 by the descent of the bucket. The function of the by-pass stop, consequently, is to temporarily hold and to release the lever immediately on the completion of a bucket-load or at the close of the poising period. The stop 570, as stated hereinbefore, is provided with a counterweight and suitable stops for maintaining it in an operative relation for coaction with the lever 569.

The bucket mechanism comprises two members, one of which is shiftable relatively to the other for discharging the load, and an actuator operative with a valve for releasing the shiftable member by the power of the valve mechanism on the completion of a bucket-load. When the weighing mechanism has come very near to the close of the poising period, it is important to instantly bring about the release of this shiftable member of the bucket mechanism relatively to the other member for discharging the load. For effecting this result a latch has been described, provided for normally holding said shiftable member against such relative movement, and the valve mechanism is also illustrated, having a latch-actuator operative with the supplemental-stream controller or valve and in position and adapted for releasing the latch by the power of the valve mechanism at the close of the poising period.

When the bucket mechanism comes very near to the close of the poising period, it becomes accurately balanced, so that for the time being it practically has no momentum and therefore does not constitute a source of power from which power may be supplied for actuating the latch to discharge the load. By means of the present improvements this necessary power is supplied from the valve mechanism, and is so applied to the latch at the proper period by the shifting of the supplemental-stream controller.

A supplemental valve or latch-actuator is shown at 88, carried on the rod 558', and the closer-latch 82 is also shown, having a stop-face 82' in position for coöperating with the latch-actuator and adapted to be engaged by said actuator to release the latch at the close of the poising period.

In the drawings are shown a pair of coacting stops, one of which, 412', is operative with the supplemental valve, and the other, 413, is operative with the closer, and in such position that each is adapted to serve as a stop device for the other, while the supplemental valve is in a position for permitting the flow of the reduced stream into the bucket, and a second pair of stops, one of which is shown at 412, operative with the valve, and the other of which is illustrated at 550', operative with the closer, and which are also positioned so that each serves as a stop device for the other when the closer is open.

Testing means are employed whereby the accuracy of a completed load may be readily ascertained. There is shown normally supported on the poising side of the beam mechanism supplemental balancing means or a poise-weight substantially similar to that described and claimed in my prior application, Serial No. 548,951, filed May 11, 1895. The supplemental balancing means or poise-weight shown is adapted to increase the weight of the poising side of the beam mechanism. The function of this supplemental balancing means is to cause the descent of the nearly-loaded bucket to the poising-line, and said balancing means approximately equals the weight of the portion of the material that is about to flow into the partially-loaded bucket and which is necessary to complete the bucket-load. The supplemental weight is shiftable from the poising side of the beam mechanism, so that its weight will be subtracted from said poising side of the beam mechanism. It will be obvious that when the machine is weighing the supplemental balancing means forms a part of the poising-weight of the beam mechanism; but on the making of a test this supplemental weight is shifted from off the poising side of the beam mechanism. Simultaneously with the shifting of the supplemental balancing means from the poising portion of the beam mechanism means are employed for rendering ineffective the bucket-discharging apparatus when it is desired to make a test. The supplemental balancing means is shown herein comprising a relatively short beam-arm 30, provided with an adjustable counterweight 30'. The supplemental balancing means is supported for oscillatory movement by the beam-supporting knife-edge 24' and is carried by the bucket-supporting knife-edge 17, but is shiftable from off the latter when it is desired to make a test. A rocking shifter is employed for shifting the supplemental balancing means from off the poising side of the beam mechanism and simultaneously therewith rendering ineffective the bucket-discharging apparatus.

The member 2' of the side frame 2 is shown provided with a rock-shaft 40, to which is clamped the crank-arm 40''. The opposite end of this rock-shaft is shown provided with a crank or link portion 571, which is adapted for connection with a suitable guide, such as a link 559', the opposite end of the latter being pivotally connected to the lever 558', which has the latch-actuator 88. The rock-shaft is also provided with a lifting-arm 571, adapted to engage the arm 33 of the supplemental weight for lifting the supplemental weight from off the poising side of the beam mechanism. It will be evident that when the supplemental weight is so shifted the actuator 88 will be thrown out of operative relation with the tripping-latch stop-pin 82', so that on the oscillation of the supplemental valve said actuator will not trip the latch 82 for thereby disengaging this from the detent 550''' of the rocker 550 to release the closer.

For maintaining the rocking shifter in either one of its positions the member 2' of the side frame 2 is shown having two holes for the reception of the pin 42 of said rocking shifter. The member 4' of the side frame 4 also carries a shifter substantially similar to that just described for shifting the rod 558 out of operative relation with the valve or stream-controller actuator 551.

A rock-shaft is shown at 40', supported by the member 4' of the side frame and having on one end thereof the crank portion 41. The opposite end of this shifter is shown provided with a link 42', by which the shifter is operatively connected with the actuating-rod 558. It will be obvious that as this shifter is shifted the rod 558 may be thrown into or out of operative relation with the actuator 551, thereby rendering said actuator ineffective.

The operation of the machine, briefly stated, is as follows: Fig. 1 shows both stream-controllers in position for permitting the flow of the full supply-stream into the bucket, and also shows the normal position for the commencement of the operation. At this time the supplemental-stream-controller stop 412' is in a position for compensating for the downward movement of the bucket by engagement with the closer operative stop 413. As soon as the load is sufficiently made up to permit the descent of the bucket and the scale-beam the actuator 551, falling slowly under the stop or rod 558, permits the shifting movement of the main valve or main-stream controller 70 to begin, the latter being shifted by the actuator 90. At about this time the supplemental-stream-controller stop and bucket discharge or closer operative stop are carried out of engagement with each other by the descent of the bucket, and the lever 569 will then be carried into engagement with the by-pass stop 570, which causes a retardation of the shifting movement of the supplemental-stream controller 60 by the actuator 91 with which said lever 569 oscillates. On the further descent of the bucket the by-pass stop 570 is carried beyond the lever 569, and as soon as these are disengaged the actuator 91 of the supplemental-stream controller shifts said supplemental-stream controller for diverting the small stream from the bucket.

In Fig. 2 the main-stream controller is represented as having shifted for diverting away from the bucket the main stream, it being assumed that the load is nearly completed. On the shifting of the main-stream controller, the supplemental-stream controller will still be in a position for permitting the continued flow of the supplemental stream, which continues to flow until the completion of the bucket-load. As just stated, the shifting of the supplemental-stream controller is prevented by reason of the engagement of the lever 569 with the by-pass stop 570, carried by the bucket. On the completion of the load, the supplemental-stream controller is immediately shifted for diverting the supplemental stream to the discharge-chute. The supplemental valve, it will be observed, carries the latch-actuator, and when the supplemental valve has diverted the drip-stream away from the bucket said actuator will be brought into contact with the stop 82' of said latch 82 and will trip said latch, which holds the bucket-discharge stop 550. The weight of material resting on the closer when these members are disengaged naturally opens said closer for discharging the load, and the bucket-discharge stop 550 is, through the toggle connection hereinbefore described, oscillated, which oscillation carries the stop 550' into engagement with the valve-stop 412, which engagement will act as an aid in preventing a reverse shifting of the supplemental valve 60.

Fig. 3 shows both valves having cut off the full supply-stream.

Having thus described my invention, I claim—

1. In a weighing-machine, the combination with beam mechanism and with bucket mechanism supported thereon for ascending and descending movements; of a supply-chute for supplying two independent streams of material to the bucket; a discharge-chute; a pair of stream-controllers for said chute, each operative for controlling one of said streams of material; and mechanism for successively shifting said stream-controllers at predetermined points in the descent of the bucket, whereby said streams of material will be successively diverted away from the bucket and toward the discharge-chute.

2. In a weighing-machine, the combination with a bucket, of a supply-stream chute; a pair of substantially flat stream-controllers located end to end, and operative for controlling the supply-stream flowing from said chute; stream-controller-shifting means for shifting said stream-controllers into alinement, to thereby permit the supply-stream to flow into the bucket, and for shifting one of said stream-controllers out of alinement with the other, to thereby vary the trajectory of a portion of the supply-stream.

3. In a weighing-machine, the combination with beam mechanism, and with bucket mechanism supported thereon for ascending and descending movements; of a supply-chute having a separator for separating the supply-stream into two independent streams of material; a discharge-chute; a pair of stream-controllers, each operative for controlling one of said streams of material; and mechanism for successively shifting said stream-controller at predetermined points in the descent of the bucket, whereby said streams of material will be successively diverted away from the bucket and toward the discharge-chute.

4. In a weighing-machine the combination with a bucket, of a supply-chute for supplying a stream of material thereto, and having an inclined floor provided with a discharge-opening, an oscillating stream-controller shiftable into alinement with said floor to thereby permit the stream of material to flow into the bucket, and also shiftable for diverting said stream of material away from the bucket and toward said discharge-opening; and stream-controller-actuating mechanism.

5. In a weighing-machine, the combination with a bucket, of a supply-chute for supplying two streams of material to the bucket; a discharge-chute; a stream-controller supporting-shaft; a pair of stream-controllers, and having one of said stream-controllers secured to said shaft, and the other movable about said shaft, and having said stream-controllers operative in one position to permit the two streams of material to flow into the bucket, and successively shiftable for successively diverting said streams of material away from the bucket and to the discharge-chute; and stream-controller-actuating mechanism.

6. In a weighing-machine, the combination with a supply-chute and its floor having two stream-discharge openings therein; of a discharge-chute adjacent to said openings; a pair of stream-controllers operative, each for closing one of said openings, whereby the supply-stream will flow from said chute over said stream-controllers and into the bucket, and also oppositely and successively shiftable for directing portions of the supply-stream toward said discharge-openings and into the discharge-chute; and stream-controller-actuating mechanism.

7. In a weighing-machine, the combination with a bucket, of a supply-chute having an inclined floor; a stream-separator carried by said floor for separating the supply-stream into two independent streams of material; a pair of stream-controllers located end to end, and operative in one position for permitting the two streams to flow into the bucket; and successively shiftable for diverting said streams away from the bucket; and stream-controller-actuating mechanism.

8. In a weighing-machine, the combination with a bucket, of a supply-chute; a combined stream separator and stop for separating the supply-stream into two independent streams of material and for also limiting one of the movements of the stream-controllers; a pair of stream-controllers; and stream-controller-actuating mechanism.

FRANCIS H. RICHARDS.

Witnesses:
  FRED. J. DOLE,
  S. W. POTTS.